US011240197B2

(12) United States Patent
Sayko et al.

(10) Patent No.: US 11,240,197 B2
(45) Date of Patent: Feb. 1, 2022

(54) SYSTEM AND METHOD FOR CREATING INTELLIGENT IP ADDRESSES

(71) Applicant: AT&T Intellectual Property I, L.P., Atlanta, GA (US)

(72) Inventors: Robert Sayko, Colts Neck, NJ (US); Susan Feit, Morganville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 99 days.

(21) Appl. No.: 16/702,656

(22) Filed: Dec. 4, 2019

(65) Prior Publication Data
US 2021/0176206 A1   Jun. 10, 2021

(51) Int. Cl.
*G06F 15/173* (2006.01)
*H04L 29/12* (2006.01)
*H04L 29/08* (2006.01)

(52) U.S. Cl.
CPC ...... *H04L 61/2007* (2013.01); *H04L 61/1511* (2013.01); *H04L 61/35* (2013.01); *H04L 67/04* (2013.01); *H04L 67/306* (2013.01); *H04L 69/329* (2013.01)

(58) Field of Classification Search
CPC ............ H04L 61/1511; H04L 61/2007; H04L 29/12066; H04L 67/306; H04L 63/102
USPC .................. 709/238, 245; 370/329
See application file for complete search history.

(56) References Cited

U.S. PATENT DOCUMENTS

| 8,032,409 | B1 * | 10/2011 | Mikurak | G06Q 30/00 705/14.39 |
| 2010/0287049 | A1 * | 11/2010 | Rousso | G06F 16/9535 705/14.53 |
| 2017/0070764 | A1 * | 3/2017 | Massoudi | H04N 21/42684 |

* cited by examiner

*Primary Examiner* — Wing F Chan
*Assistant Examiner* — Andrew Woo

(57) ABSTRACT

A method includes obtaining subscriber attributes from a subscriber, encoding the subscriber attributes into an internet protocol (IP) address, and assigning the encoded IP protocol address to the subscriber. The encoded IP address with attributes specific to the subscriber may then be used to provide customized and enhanced services to the subscriber and provide more efficient operations for the service provider.

18 Claims, 3 Drawing Sheets

SYSTEM AND METHOD FOR CREATING INTELLIGENT IP ADDRESSES

TECHNICAL FIELD

This disclosure is directed to adding intelligence to internet protocol (IP) addresses by encoding subscriber attributes into those IP addresses.

BACKGROUND

IP addresses are typically assigned randomly. To some extent, IP addresses are mapped to geographic regions for convenience and for ease of adding IP subnets for additional customers to aid in firewall settings. Geographical IP address also are useful for trouble shooting larger outages. However, beyond some geographic constraints, which are admittedly not ubiquitous, there is currently very little, if anything, in the IP address that further identifies or provides more detail about the customer.

Internet Service Providers (ISPs) are looking for ways to learn more about their Internet customers, including demographics, locations, data usage, sites visited, and other relevant data. ISPs are increasingly using big data analytics to ascertain additional customer information; however, such analytics can be expensive to implement and thereafter mine and classify the data.

Thus, there is a need for ISPs to be able to quickly and accurately obtain additional relevant information about their customers.

SUMMARY

The present disclosure is directed to a method including obtaining subscriber attributes from a subscriber, encoding the subscriber attributes into a unique internet protocol (IP) address and assigning the unique encoded IP address to the subscriber. In an aspect, the subscriber attributes are entered into an IP address assignment system by a customer service representative or are entered into an IP address assignment system by the subscriber. The subscriber attributes may be determined in part based on data obtained from external sources. The method may further include receiving a request for DNS service from the subscriber and returning a website based on the unique encoded IP address and the request. In an aspect, the unique encoded IP address is indicative of a preferred language of a subscriber and the website returned matches the preferred language. The method may further include receiving a search request from the subscriber and wherein search results are returned based in part on the unique encoded IP address and wherein the unique encoded IP address is indicative of an income level of the subscriber and the search results returned are associated with the income level.

The method may also include assigning a second unique encoded IP address to a second subscriber wherein the unique encoded IP address and the second unique encoded IP address share common attributes associated with the first subscriber and the second subscriber and wherein the unique encoded IP address includes other attributes associated with the first subscriber and the second unique encoded IP address includes other attributes associated with the second subscriber. The unique encoded IP address may be modified when the subscriber accesses the internet using a mobile network. In an aspect, the encoded IP address to a data repository and the method further includes collecting historical data associated with the unique encoded IP address and wherein data analytics are performed on a combination of the historical data and the unique encoded IP address.

The disclosure is also directed to an apparatus including an input-output interface, a processor coupled to the input-output interface wherein the processor is further coupled to a memory the memory having stored thereon executable instructions that when executed by the processor cause the processor to effectuate operations including obtaining general subscriber attributes from a first subscriber, obtaining individual subscriber attributes from the first subscriber, encoding the general subscriber attributes and the individual subscriber attributes into a unique encoded internet protocol (IP) address, and assigning the unique encoded IP protocol address to the subscriber. The operations may further include modifying the unique encoded IP address when the subscriber accesses the internet using a mobile network. The unique encoded IP address may include system level attributes associated with the mobile network and the unique encoded IP address changes if the system level attributes associated with the mobile network changes.

In an aspect, the operations may further include obtaining individual second subscriber attributes from a second subscriber, encoding the general subscriber attributes and the individual second subscriber attributes into a second unique encoded an IP address, and assigning the second unique encoded IP protocol address to the second subscriber. The operations may further include modifying the second unique encoded IP address when the second subscriber accesses the internet using a mobile network wherein the unique encoded IP address includes system level attributes associated with the mobile network. In an aspect, the operations may further include accessing the internet wherein the unique encoded IP address is used when the first subscriber accesses the internet and the second unique encoded address is used when the second subscriber accesses the internet.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
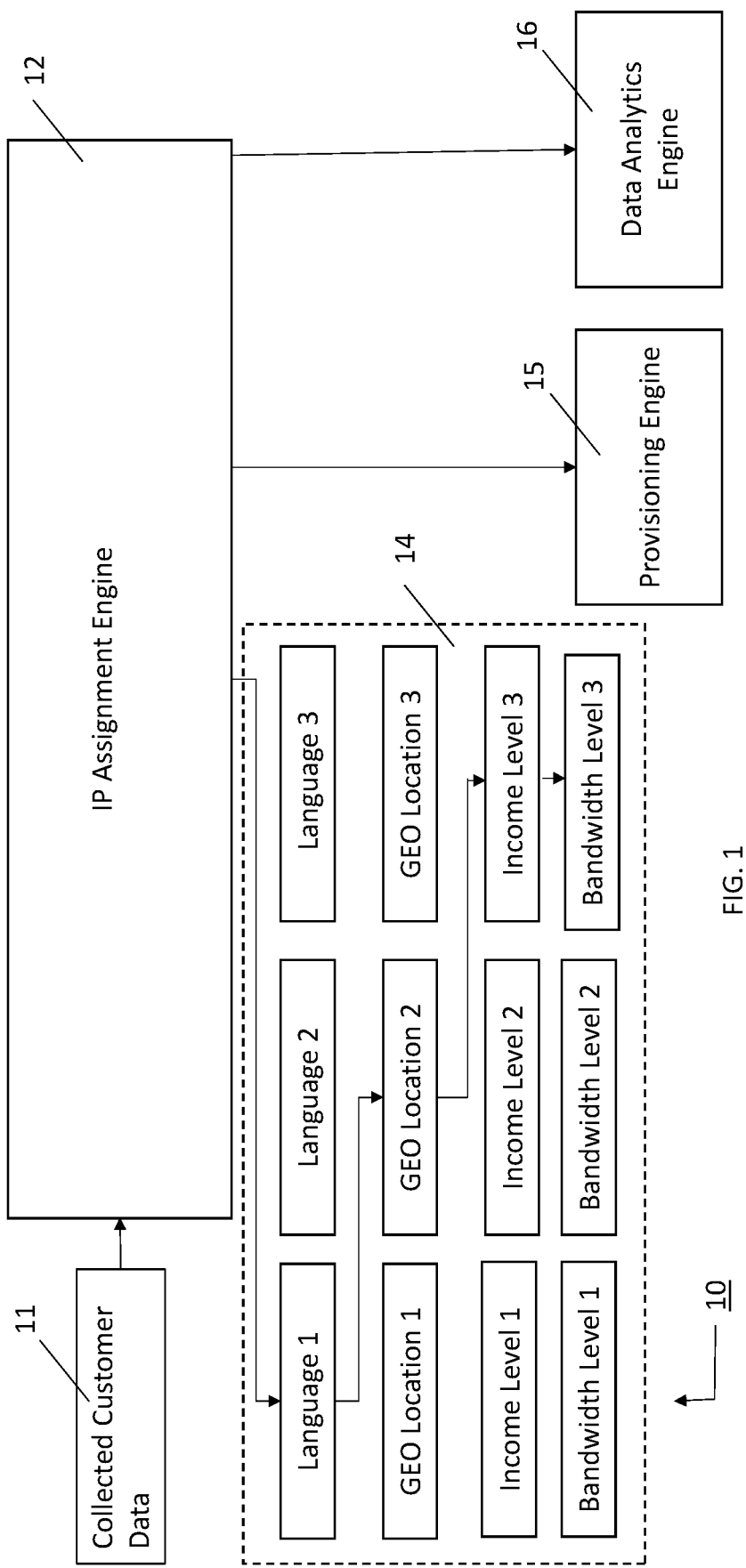
FIG. 1 illustrates an exemplary system for implementing intelligent IP addressing in accordance with the present disclosure.

System Overview. This disclosure is directed to a novel system and method for creating and assigning intelligent IP addresses by adding a level of intelligence to IP addressing. By assigning a meaning to IP ranges and sub-nets that are provided to its subscribers or users, an ISP may collect or use data whenever the user contacts the service provider and when the subscriber uses services such as DNS. Intelligent IP addresses may provide important data for various analytics, targeted advertising and other functions that that will enhance the customer experience and provide additional value to the ISP. Importantly, the disclosure facilitates real time identification of a customer, customer classification and certain preferences of the customer. Unless otherwise specified, a customer and subscriber will be used interchangeably throughout. Unless otherwise specified, an intelligent IP address will be used interchangeably with an encoded IP address as described herein.

An Ipv6 address uses 128 bits as opposed to 32 bits in IPv4. IPv6 addresses are written using hexadecimal, as opposed to dotted decimal in IPv4. An IPv6 address is represented as eight groups of four hexadecimal digits, each group representing 16 bits (two octets, a group sometimes also called a hextet). The groups are separated by colons (:). An example of an IPv6 address is: 2001:0db8:85a3:0000:0000:8a2e:0370:7334. It is within this additional addressable space of Ipv6 that the present disclosure may be implemented. Such an address space will permit the encoding of invaluable information about the subscriber and the services offered to that subscriber to add a degree of intelligence to the IP address. Accordingly, the systems and methods of the present disclosure provides a practical application in the arts and advances the state of the technological arts associated with internet computing.

The disclosure will be described with reference to IPv6, however the systems and methods described herein may also be applicable to IPv4 as well. In accordance with this disclosure, the assignment of IP addresses may no longer be random or quasi-geographical, but rather such assignment of IP addresses may become a managed process. This process may use the IP address space divided in a way so as to provide subscribers with both an IP address and other information that an ISP may further define to describe the subscriber or subscriber group. Additionally, IP addresses within a subnet may be assigned based on subscriber preferences that are provided by the customer. It should be kept in mind that the sub-nets might be a hierarchy of sub-nets that encode customer information. When the customer uses their internet (data) services to contact a provider—for services such as DNS and others—the provider's service instantly may learn useful information about the customer because of their "customized" source IP. Logins, queries, and other internet communications may be passed to an analytical engine within the service provider's infrastructure. All services and interactions will be more readily organized and able to be applied to whatever analysis the provider undertakes.

By example only and not limiting the scope of the disclosure and the appended claims, a service provider may assign IP addresses based on the demographics of a sub-section of a served region. If, for example, a service provider's region is defined by a state, then some counties, cities, or zip codes within the state may be assigned IP addresses with a specific sub-net that inform the average income level for that county, city or zip code. By assigning an IP address keyed to that income demographic, the service provider will have immediate information on that customer based on that source IP address whenever that customer uses a service such as DNS. Extracting that type of information would ordinarily require a complex analysis within the corporate analytics engine, but with the intelligent IP address, the service provider would have a faster and more efficient way of obtaining that information to enhance the customer service experience or to target more relevant advertising to that customer.

A customer may also specify a language preference, either through provisioning through a customer service representative or by configuring the service though a customer driven on-line application or provisioning system. The service provider may then assign an IP address from the sub-net hierarchy that will match that language preference. For example, a customer may request Spanish as a language preference. Meanwhile, DNS may have multiple IP addresses for that particular website, each IP address referencing a different language of the website. So, continuing this example, BMW.com may have an IP address for an English-language site, a second IP address for a Spanish-language site and a third IP address for an Italian-language site. A subsequent DNS query for BMW.com by this customer using the assigned source IP address will return the IP address that directs the customer to the Spanish BMW home page. This results in enhance customer service as there would be no effort or extra steps to get to the Spanish page. Moreover, the service provider may be able to monetize the DNS service because the site owner may want to purchase this option. It will be understood that the above-scenario is an example only. The language preference is but one example of how DNS service may be more efficient with the use of the systems and methods of the present disclosure. It will be understood by those skilled in the art that there are many other use cases, including, but not limited to, returning content based on IP bandwidth, demographics associated with the encoded IP address, retail or other shopping preferences or any other attributes encoded into the IP address.

The language attribute may also benefit a function like customer service. Should the customer contact customer services via a chat window, the customer may be directed immediately to a Spanish language speaking representative. Again, this would work best through using the DNS.

The present disclosure may work with other systems to enhance the customer experience and help service providers save or further monetize their services. For example, using big data analytics on top of the intelligent IP addressing. The intelligent IP addressing coupled with history and other data may assist the service provider in allocation of bandwidth and the provision of other ancillary services while at the same time enhancing the customer experience and value proposition.

System Architecture.

With reference to FIG. 1, there is shown an exemplary system 10 in which the present disclosure may be implemented. There may be an IP address assignment engine 12 which assigns the IP address to a subscriber. The assignment engine 12 may use inputs that describe the subscriber in view of location, demographics, preferences, history, personal or any other data. The subscriber data may be collected by a collection system 11 which may be an online application system accessed by the subscriber who may input such data from a questionnaire or free form. Alternatively, a customer service representative may solicit subscriber data from the subscriber and input into the collection system 11. The collection system 11 may also receive data from a subscriber's current or previous internet service provider whereby a customer may be moving from one location to another or upgrading internet service which results in the assignment of a new or updated IP address. Such a new or updated IP address may also result from an upgrade from an Ipv4 and Ipv6.

Examples of such data are shown in an exemplary attribute matrix 14. Such attributes as shown may include a language preference such as Language 1, Language 2, or Language 3 which may, for example, be English, Spanish, Italian, French or any other language. Also shown are three different geographic locations GEO Location 1, GEO Location 2 and GEO Location 3. Other customer attributes or preferences in the attribute matrix 14 may include various income levels (Income Level 1, Income Level 2 and Income Level 3) and broadband bandwidth of the subscriber's internet service (Bandwidth Level 1, Bandwidth Level 2 and Bandwidth Level 3). It will be understood that these attributes are exemplary only and the attribute matrix 14 may include other attributes, preferences or other data such as other subscription services received from the service provider, education level, age, number of individuals in the household, length of time at the residence, occupation, or occupations within the household, identification of the address as a single or multi-family structure, an indication of rental property, or any of a host of other attributes.

Also shown in FIG. 1 is an exemplary arrow that weaves through the attribute matrix 14. In this example, the assignment engine selects attributes based on the collected customer data 11 which coincides with Language 1, GEO location 2, Income level 3 and bandwidth level 3. The IP assignment engine would use these attributes by encoding the attributes into designated fields of the IP address. For example, the selected combination of attributes may be encoded in one of a group of four hexadecimal digits in the IPv6 addressing scheme.

The addressing scheme for the subscriber may then be passed to a provisioning engine 15 which would then provision the subscriber with the intelligent IP address associated with the subscriber. As such, the intelligent IP address may then be associated with all internet traffic from that location, providing valuable insight into the subscriber and enhancing the subscriber experience. The intelligent IP address may also be passed to a data analytics engine for use by the service provider.

It will also be understood that the IP address may change if the attributes of a subscriber change. For example, elderly parents may move in with a son or daughter, changing the demographics of the household. In that case, the subscriber or the service provider may request a change in the intelligent IP address to reflect this change. In addition to changing attributes, attributes may be added or deleted which may suggest a change in the intelligent IP address.

With the expanded internet protocol addresses available in IPv6, a service provider may further encode the IP address for multiple users at the same IP address. For example, one of the hexadecimal digits may be designated to identify one of a plurality of users from a household and thus further personalize the intelligent IP address. Thus, a Spanish-speaking parent may have a different intelligent IP address from an English-speaking daughter in that same household. Expanding this concept, in an aspect, each subscriber may have their own personal encoded IP address, even if a member of the same household and even if that member of the household is accessing the internet through the same IP access point. The personal encoded IP address may include encoded fields specifically associated with that subscriber, together with global fields that may be populated based on the device or location of the IP access point or other attributes for that household. For example, a household may have global attributes encoded into the household-based intelligent IP address and then a particular user in that household may have personal attributes populated in other fields reserved for such personal attributes encoded into the IP address. As such, the encoded IP address becomes personal to each user.

The encoded IP address is also useful for mobility access to the internet using the same general principles. For example, a wireless IP address may be different each time information such as a device's immediate location may change. The personal attributes associated with a subscriber may follow that subscriber. When that mobile subscriber accesses the internet, a personal encoded IP address may be created that includes the global system-level information populated in certain fields of the encoded IP address and the personal attributes populating other fields in the encoded IP address. As such, a personal IP address may be dynamically created regardless of whether the subscriber is accessing the internet through the mobility network or through a traditional broadband network.

In an aspect, the IP assignment engine 12 may include logic to include more global attributes that are common (to a household or group), and personal attributes into a personalize encoded IP address. Such an IP assignment engine 12 may then dynamically and quickly assign an IP address for each interaction or set of interactions with the internet as desired, depending on the type of access desired (broadband or mobile), common attributes associated with the subscriber or group of subscribers in a household or common location such as an office location, and personal attributes associated with an individual subscriber.

Methods of Assignment and Use.

Figure 2:
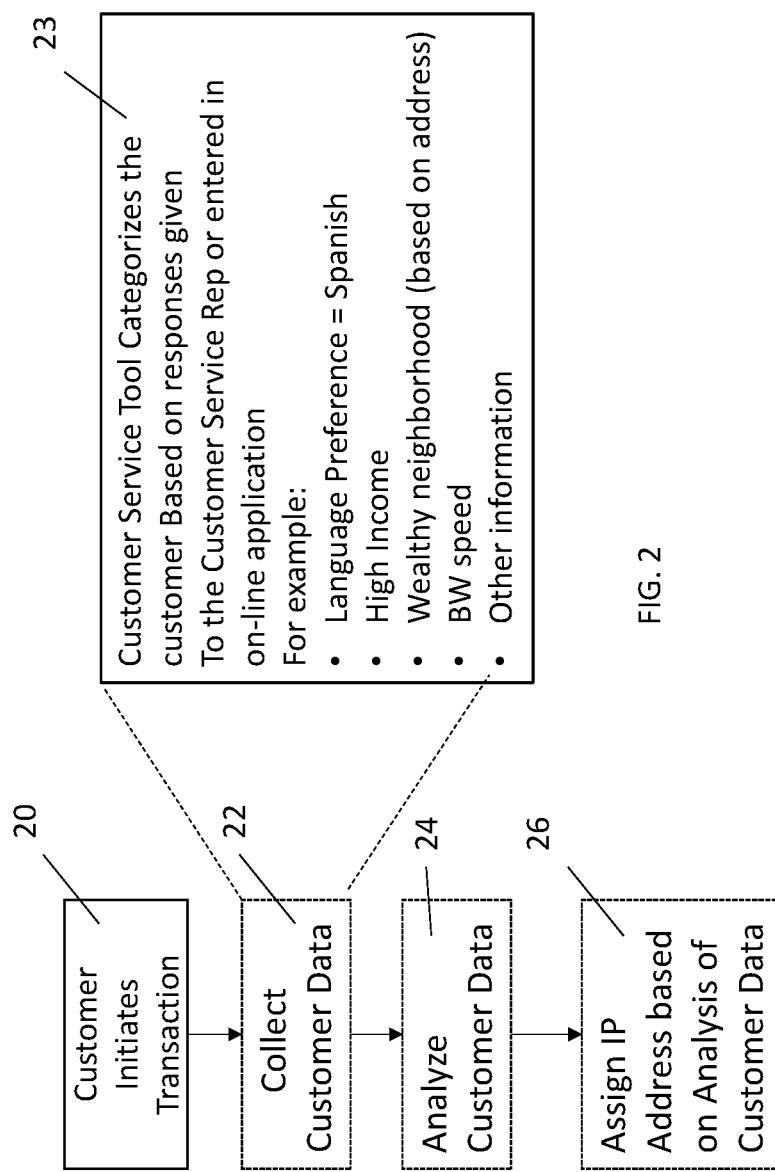
FIG. 2 illustrates an exemplary method of assigning an intelligent IP address in accordance with the present disclosure.

With reference to FIG. 2, there is shown an exemplary flow diagram of the assignment of an intelligent IP address to a customer. At 20, the customer initiates a transaction with the service provider. This transaction may be in the form of a call to a customer service representative, filling out a form on-line, accessing an application on a smart phone, or any other type of communication transaction between a customer and a service provider. At 22, the system would collect customer data. Examples of customer data are shown in block 23, which shows a customer service tool that may characterize the customer in accordance with one or more of the attributes from the attribute matrix 14. At 24, the IP assignment engine 12 may analyze the customer data and then at 26 assign an IP address to the customer based on an analysis of the collected customer data.

Figure 3:
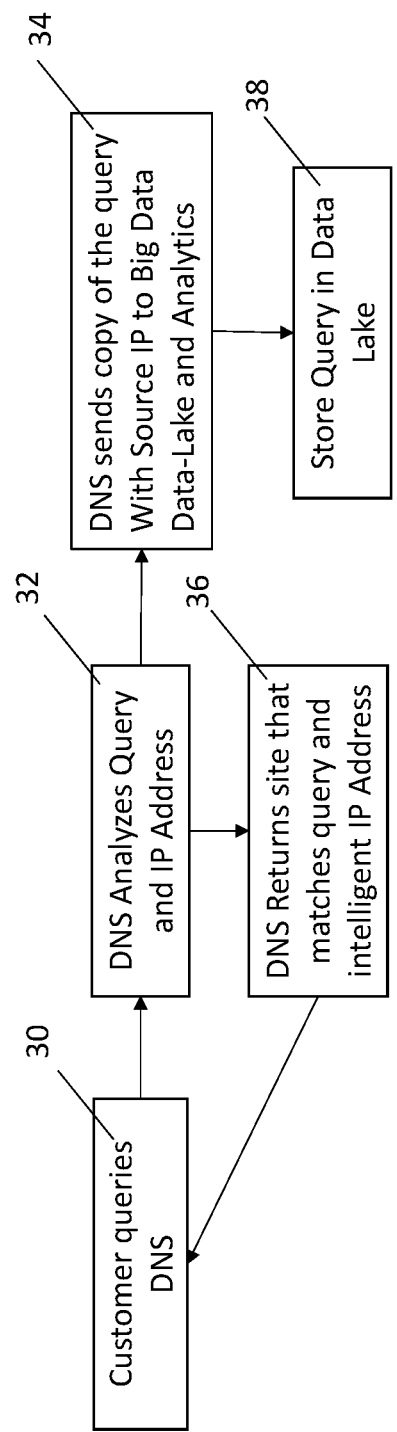
FIG. 3 illustrates an exemplary method of use of an intelligent IP address in accordance with the present disclosure.

With reference to FIG. 3, there is shown an exemplary method of use of the system of the present disclosure. In this example, it is assumed that an intelligent IP address has been provisioned in accordance with the methods set forth herein. At 30, the customer may query the DNS system of the service provider. At 32, the DNS analyzes the query and also analyzes the intelligent IP address that contains the attributes as selected by or assigned to the customer. At 36, the DNS returns the site that matches the query but also matches the attributes encoded in the intelligent IP address. For example, the query may be for vacation housing, and the intelligent IP address may return a Spanish-speaking site for one subscriber and an English-speaking site for a second subscriber.

In addition to returning the URL, at 34 DNS may also send a copy of the query to the data analytics engine 16 and wherein the query and source IP address may be stored in the data lake 38. The data analytics engine may use the intelligent IP address, subscriber history and other data to enhance the customer experience and value proposition. Likewise, the service provider may use the analytics to maintain and upgrade system architecture, consider traffic patterns, and provide targeting advertising and ancillary services to the subscriber.

While examples of an internet system in which IP addresses may be encoded to capture intelligence regarding the subscriber have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While an internet system has been described in connection with the various examples of the various figures, it is to be understood that other similar implementations may be used, or modifications and additions may be made to the described examples of a telecommunications system without deviating therefrom. For example, one skilled in the art will recognize that an internet system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
  obtaining, by a processing system including at least one processor, subscriber attributes from a first subscriber;
  encoding, by the processing system, the subscriber attributes that are obtained into a unique encoded internet protocol address, wherein the subscriber attributes are encoded into designated fields of the unique encoded internet protocol address;
  assigning, by the processing system, the unique encoded internet protocol address to the first subscriber; and
  assigning a second unique encoded internet protocol address to a second subscriber wherein the unique encoded internet protocol address and the second unique encoded internet protocol address share common attributes associated with the first subscriber and the second subscriber and wherein the unique encoded internet protocol address includes other attributes associated with the first subscriber and the second unique encoded internet protocol address includes other attributes associated with the second subscriber.

2. The method of claim 1, wherein the subscriber attributes are entered into an internet protocol address assignment system by a customer service representative.

3. The method of claim 1, wherein the subscriber attributes are entered into an internet protocol address assignment system by the first subscriber.

4. The method of claim 1, wherein the subscriber attributes are determined in part based on data obtained from external sources.

5. The method of claim 1, further comprising:
  receiving a request for a domain name system service from the first subscriber and returning a website based on the unique encoded internet protocol address and the request.

6. The method of claim 5, wherein the unique encoded internet protocol address is indicative of a preferred language of the first subscriber and the website returned matches the preferred language.

7. The method of claim 1, further comprising:
  receiving a search request from the first subscriber and wherein search results are returned based in part on the unique encoded internet protocol address.

8. The method of claim 7, wherein the unique encoded internet protocol address is indicative of an income level of the first subscriber and the search results returned are associated with the income level.

9. The method of claim 1, wherein the unique encoded internet protocol address is modified when the first subscriber accesses the internet using a mobile network.

10. The method of claim 1, further comprising:
  adding the unique encoded internet protocol address to a data repository.

11. The method of claim 10, further comprising,
collecting historical data associated with the unique encoded internet protocol address and wherein data analytics are performed on a combination of the historical data and the unique encoded internet protocol address.

12. An apparatus comprising:
an input-output interface; and
a processor coupled to the input-output interface wherein the processor is further coupled to a memory, the memory having stored thereon executable instructions that when executed by the processor, cause the processor to effectuate operations, the operations comprising:
obtaining general subscriber attributes from a first subscriber;
obtaining individual subscriber attributes from the first subscriber;
encoding the general subscriber attributes and the individual subscriber attributes that are obtained into a unique encoded internet protocol address, wherein the general subscriber attributes and the individual subscriber attributes are encoded into designated fields of the unique encoded internet protocol address;
assigning the unique encoded protocol address to the first subscriber;
obtaining individual second subscriber attributes from a second subscriber;
encoding the general subscriber attributes and the individual second subscriber attributes into a second unique encoded internet protocol address; and
assigning the second unique encoded internet protocol address to the second subscriber.

13. The apparatus of claim 12, wherein the operations further comprise:
modifying the unique encoded internet protocol address when the first subscriber accesses the internet using a mobile network.

14. The apparatus of claim 13, wherein the unique encoded internet protocol address includes system level attributes associated with the mobile network.

15. The apparatus of claim 14, wherein the unique encoded internet protocol address changes if the system level attributes associated with the mobile network change.

16. The apparatus of claim 12, wherein the operations further comprise:
modifying the second unique encoded internet protocol address when the second subscriber accesses the internet using a mobile network.

17. The apparatus of claim 16 wherein the second unique encoded internet protocol address includes system level attributes associated with the mobile network.

18. The apparatus of claim 12, wherein the operations further comprise:
accessing the internet, wherein the unique encoded internet protocol address is used when the first subscriber accesses the internet and the second unique encoded address is used when the second subscriber accesses the internet.

* * * * *